Nov. 27, 1923.
W. B. HARSEL
1,475,300
CORD TIRE AND METHOD OF MAKING SAME
Filed July 15, 1918  3 Sheets-Sheet 1
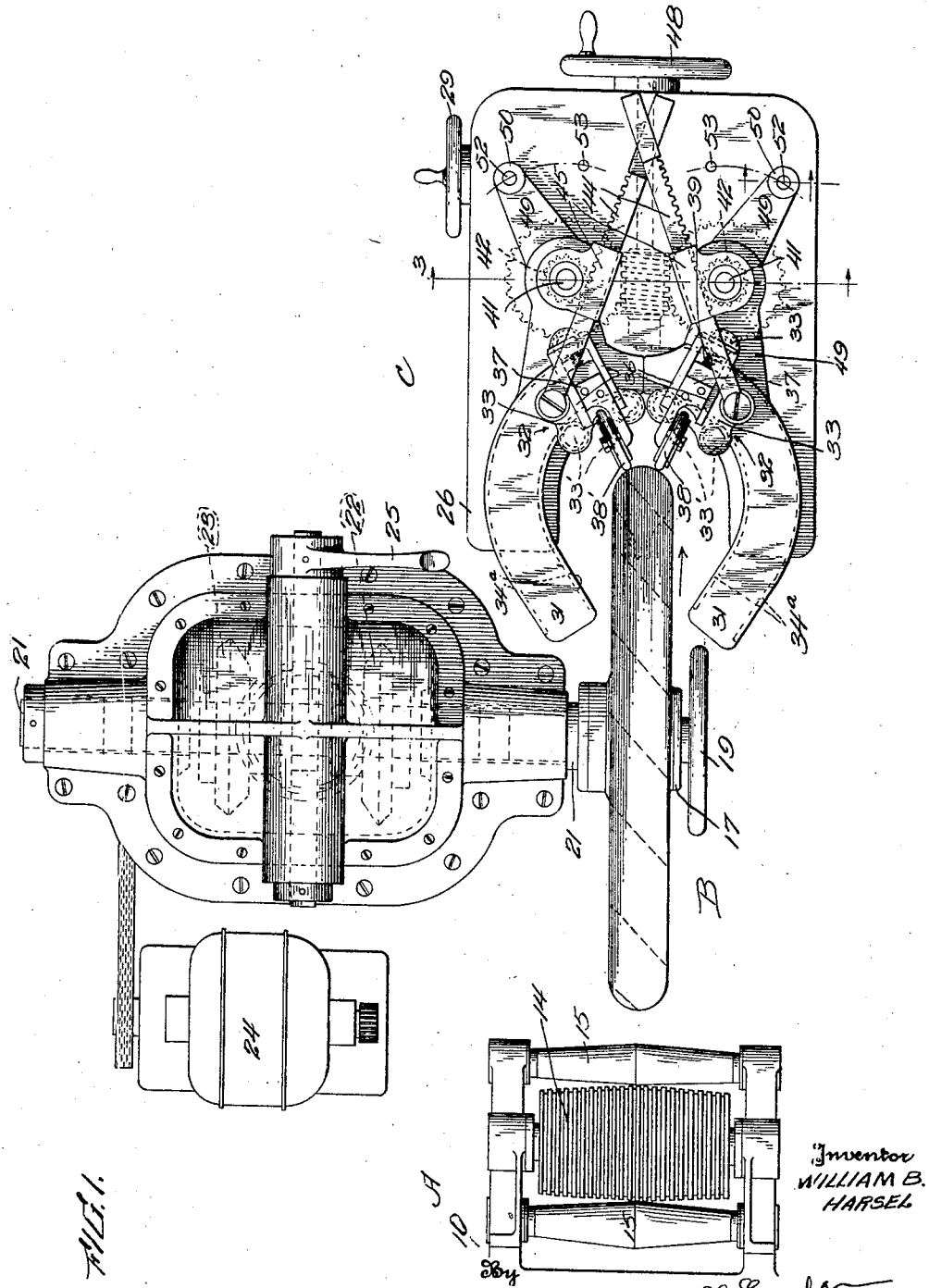
Inventor
WILLIAM B. HARSEL

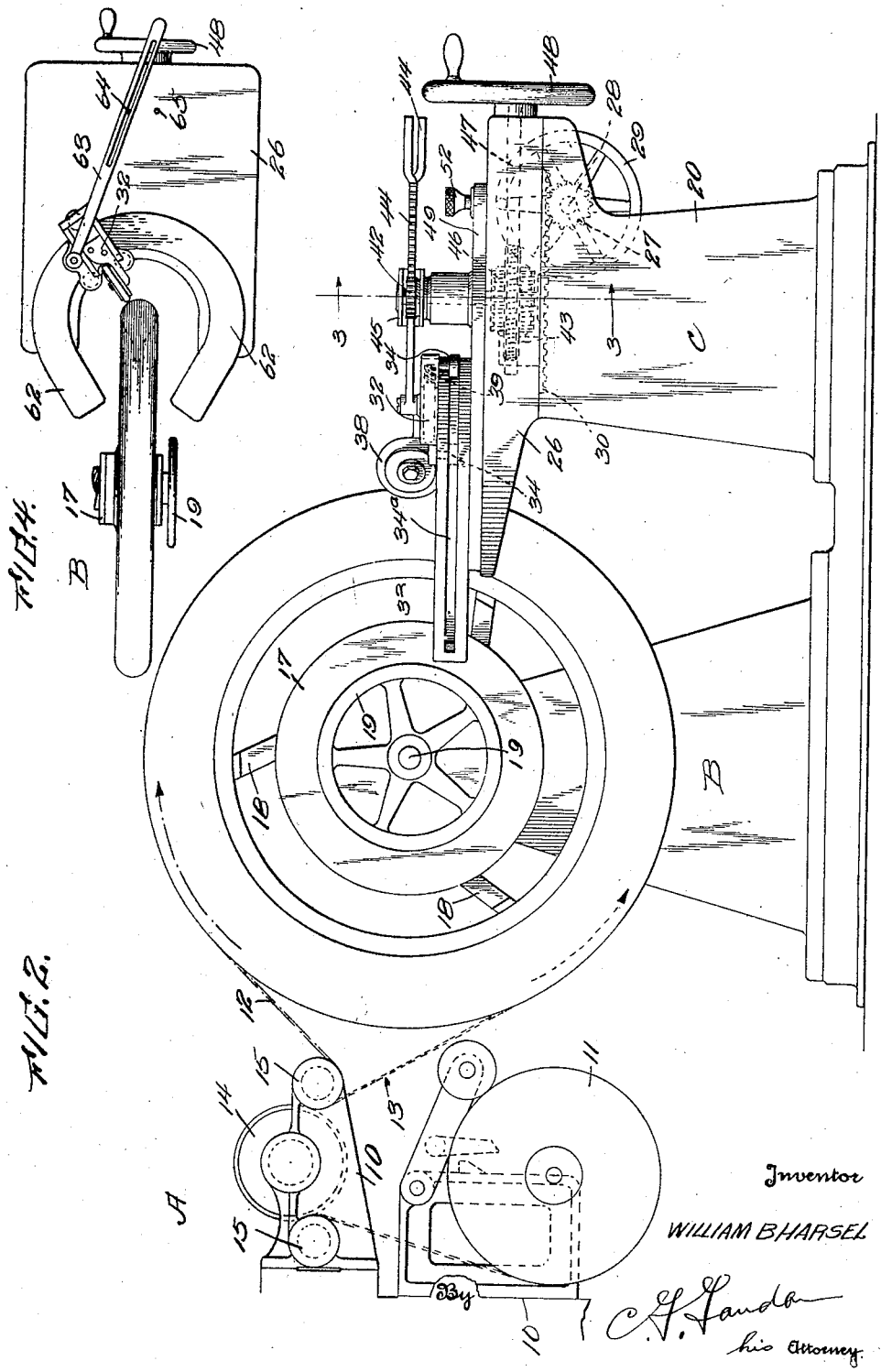

Nov. 27, 1923.
W. B. HARSEL
1,475,300
CORD TIRE AND METHOD OF MAKING SAME
Filed July 15, 1918    3 Sheets-Sheet 3
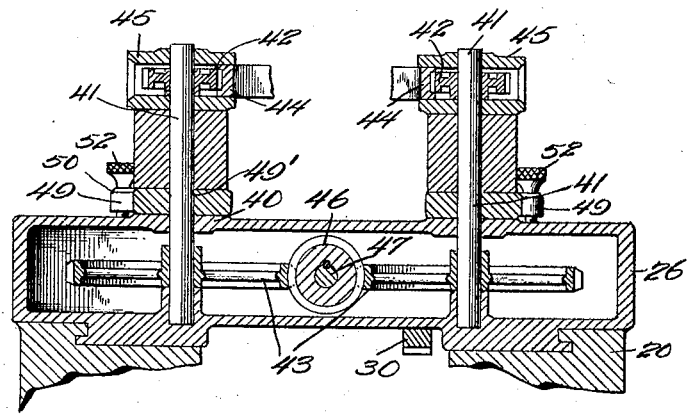
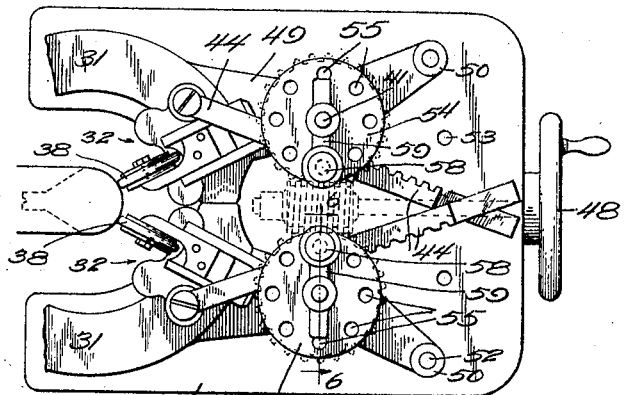
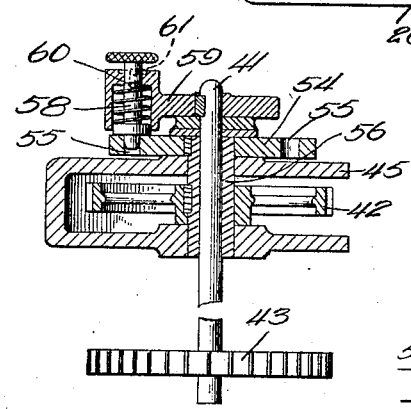
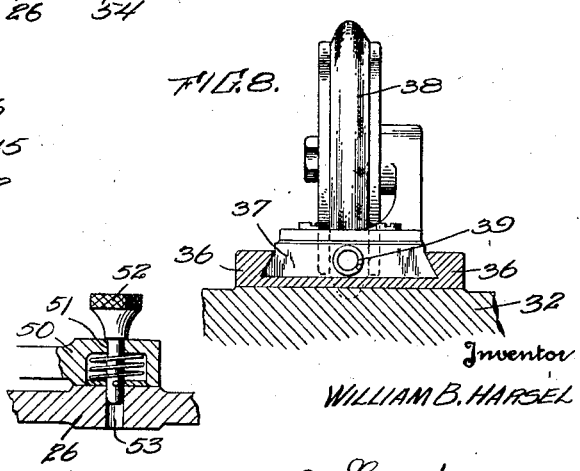
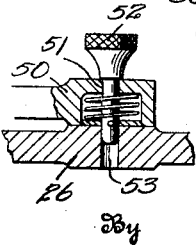
Inventor
WILLIAM B. HARSEL
By C. H. Landon
his Attorney Patented Nov. 27, 1923.

1,475,300

UNITED STATES PATENT OFFICE.

WILLIAM B. HARSEL, OF AKRON, OHIO, ASSIGNOR TO THE GOODYEAR TIRE & RUBBER COMPANY, OF AKRON, OHIO, A CORPORATION OF OHIO.

CORD TIRE AND METHOD OF MAKING SAME.

Application filed July 15, 1918. Serial No. 244,980.

*To all whom it may concern:*

Be it known that I, WILLIAM B. HARSEL, a citizen of the United States, residing at Akron, in the county of Summit and State of Ohio, have invented new and useful Improvements in Cord Tires and Methods of Making Same, of which the following is a specification.

My present invention relates primarily to the class of tire-building machines, and more particularly to a machine of this character adapted to build up tire-carcasses and especially those for so-called "cord" tires.

In the case of "fabric" tires—in which the threads extend at an angle, relatively—a revoluble core or mandrel has long been known and used as a desirable former, in conformity with which the plies of the fabric may be shaped by mechanically-operated shaping (that is, stitching) mechanisms, operating on opposite sides of the core, in order to give the tire its initial configuration. "Cord" tires are built up entirely of plies or strands of material composed primarily of cords running at a bias-angle to the width of a ply and being substantially unconnected with, and independent, of each other. Owing to the peculiar construction of the "cord"-fabric and cords, the methods employed in the building of carcasses therefrom are necessarily somewhat different from those utilized to build fabric tires.

Where cords of small diameter are employed, it is customary to build a cord-tire of six, eight, ten, twelve or even fourteen plies or layers, as against the four, five or six ply fabric-tires. The fabrics for successive plies of the last-named tires are usually placed in independent rolls grouped upon some type of stock-rack (such as a revoluble turret), and presenting the rolls successively to the center line of the revoluble core or mandrel upon which the plies of the tire are to be "stitched" into shape. In the case of a cord-tire having a larger number of plies, the requisite stock-rack for supporting ten, twelve or fourteen independent rolls for successive use by the tire-builder would be a cumbersome and unwieldy mechanism and a constant source of delay in the tire-building processes.

The stitching mechanism which in general is employed upon fabric tire-building machines would, for the making of cord-tires, have certain disadvantages by reason of the fact that the stitching operations are performed on a one-way rotating core by stitcher-devices which traverse the threads on one side more or less cross-wise instead of lengthwise. But, such an operation for stitching down the plies or cords of unwoven cords upon the core for cord-tires is quite impracticable owing to the fact that the independent cords in the latter case would be liable to injury or displacement. If stitchers were simultaneously employed on opposite sides of a one-way rotating core for the stretching and smoothing effect, the crosswise traversing of the cords by the stitchers would distort such cords seriously. It has been desirable, therefore, to "favor" the natural forty-five degree bias-angle which the independent parallel cords make with the forming core as much as possible during the stitching process. By "favoring" the bias-angle of the cords is meant the spiral progress of a stitcher-wheel about the periphery of the ply in such manner that the stitcher runs, as far as possible, along the direction of the cord-angle rather than flatly against the cord.

It is with full cognizance of the foregoing conditions, and the discovery that they would result in the production of defects or weaknesses in cord-tires, that I propose a tire-building machine in which the stitching down of each ply or layer of cords will be in conformity with the direction of movement of the core and so that this operation may be accomplished without injury to the threads or cords in their natural lay.

In general, the machine which I now propose to utilize for the making of tire carcasses may, with more or less (but generally unimportant) modifications, be employed for the manufacture of various types of tire carcasses.

More specifically, it is an object of the present invention to provide a tire-machine which may be equipped with a core mounting and driving mechanism therefor of such nature that the core may be revolved in either direction in order to permit the stitching operations to be performed on opposite tire portions to favor the angle of the cord placement in each layer, or successive oppositely-angled layers or plies; and the underlying and salient principle of operation of the machine thus contemplated is, therefore, peculiarly applicable to "cord" tire carcasses.

It is a further object of the present invention to equip a tire-machine with stitcher-mechanisms adapted to shape successive plies or layers of a material into conformity to a revoluble core in such manner that the planes of the stitcher-wheels are constantly perpendicular to the core-surface over which they pass.

It is a still further object of the present invention to provide stitcher-mechanism for tire-machines consisting of a trackway and of one or more stitcher-carriages mounted for movement upon the trackway in nearly a complete encirclement of the cross-section of the core or mandrel upon which the tires are built.

It is also an object contemplated by the present invention to provide stitcher-mechanism for a tire-machine in which the stitcher-devices are separately mounted upon carriages whose path of movement about a carcass-building core or mandrel is specifically defined by a common run-way, the movement of the stitchers along said run-way being automatically controlled.

The above and additional objects of a similar nature, which will hereinafter be more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which similar reference numbers designate corresponding parts:

Figure 1 is a view in plan of a tire building machine comprehended by the present invention;

Fig. 2 is a view in front elevation of the machine;

Fig. 3 is a view in vertical section on the line 3—3 of Fig. 1;

Fig. 4 is a view in plan, on a smaller scale, of a modification of the stitcher arrangement;

Fig. 5 is a detailed plan view, on an enlarged scale, of a further modification of the stitcher arrangement;

Fig. 6 is a view in section on the line 6—6 of Fig. 5;

Fig. 7 is a detailed sectional view; and

Fig. 8 is a sectional detail of one of the stitchers.

The machine of the present invention may be considered as being composed of three main elements which are grouped to form an operative whole. These elements are to be listed as the stock-rack A, the carcass-forming core or shaping mandrel B, and the stitcher mechanism C. The first supports the tire-building material in readiness for use upon the carcass-shaping mandrel B, while by the stitcher mechanism C the tire-material is shaped into true conformity with the mandrel, layer on layer, or ply on ply.

*Stock-rack.*—The stock-rack A may desirably take the form of a turret mounted for rotation upon a support or base, such turret being provided with a number of supporting arms 10—one of which is shown—upon which may be carried rolls 11 of the tire-building material. The number of the supporting arms 10 required has customarily varied with the number of plies or layers of which the tire is to be constructed, owing to the fact that the successive plies are necessarily of slightly different widths. In the construction of cord-tires, however, a separate stock-roll for each ply of tire-material would necessitate a cumbersome stock-turret, indeed. For this reason, I prefer to take two plies of the stock-material from each roll, so that a twelve-ply tire requires at the most six different stock-rolls.

It is a desideratum in some types of cord-tires that adjacent tire-plies may be laid in such a manner that the common bias-angle of the parallel cords of one ply shall bear an opposite relation to the carcass-forming core compared with the cord-angle of the ply beneath. Where the bias-angle is determined at, say, forty-five degrees, it is desirable to have the cords of the one ply crossing the cords of the ply beneath at, say, an angle of ninety degrees.

*Carcass-forming core.*—In order to be able to take off two successive plies from the same stock-roll in such manner that the cords of the plies will bear an opposite relation to the carcass-building core or mandrel, it is necessary to mount the latter for revolution in both directions, and to take the first ply of material from the stock-roll 10 off along the line 12 (Fig. 2) to the top of the core, with the latter revolving slowly in a clockwise direction. The second ply of material from the same stock-roll is to be taken along the dotted line 13 to the bottom of the mandrel with the latter revolving in a counter-clockwise direction. This arrangement achieves both objects of securing two plies of a tire-material from a single stock-roll and of oppositely crossing the cords or threads in each ply as they are laid up upon the cord.

The stock-rack A carries, in conjunction with each stock-roll 11, a spreader-roll 14 which is constructed of a double frusto-conical shape having the greatest diameter in the center of the roll and being provided with peripheral flanges which lead off helically from the roll center at a slight angle oppositely in each direction to one of the mounting ends of the roll. As the cord-material is pulled under this spreader-roll and between the juxtaposed smaller double-coned rollers 15, the material is prevented, by the action of the flanges thereagainst, from bulging or wrinkling in the center, and comes out flat for application to the mandrel.

The mandrel or core is supported upon a chuck 17 which includes a casing from which extends a plurality of arms 18, the extension of the latter being controlled in any well-known fashion through the medium of a hand-wheel 19 in order that the mandrel may be supported upon the chuck for rotation therewith and in juxtaposition to a stitcher-supporting pedestal 20. The chuck is carried at the extremity of a shaft 21, provided with a pair of oppositely-facing beveled gears 22 and 23. A motor 24 is employed to furnish the power for revolving the shaft 21 with its chuck and mandrel, the direction of rotation of the mandrel being governed by the meshing of the respective gears 22 and 23, which may be controlled in any desirable manner by the operator through the medium of a handle 25.

*Stitcher mechanism.*—There now remains to be described the stitcher-stand which is employed to support the stitcher-mechanism C whereby successive plies or layers of a tire are laid into close conformity with the mandrel.

Upon the pedestal 20, which may be provided for this purpose with grooves, rails, channels or other similar equipment for effecting the same result, there is slidably mounted a stitcher-supporting head or carriage 26 adapted to be advanced and retracted in a radial direction with respect to the core or mandrel by the action of a pinion 27 on a shaft 28. This shaft is rotated by a hand-wheel 29. The pinion 27 meshes with a rack 30 fastened to the bottom of the head 26 by any suitable means. The carriage sustains and positions the following stitcher-mechanism in relation to the core: A pair of semi-circular cams 31, on the forward portion of the stitcher head 26, is adapted to control the movement of a pair of stitcher-supporting slides 32. Each of these slides consists of a body portion 33, which is provided with a series of bearings 33' for supporting guide-rolls 34. In the drawings, I have illustrated two of the guide-rolls as mounted to travel on one side of the body-portion 33 adjacent the core, and only one as traveling on the opposite side thereof. It is to be understood that any number of these rolls may be employed; but I have found in practice that the three rolls, just described, perform the required function more satisfactorily.

Suitable slots 34ª in the edges of the cams 31 retain the rolls 34 in correct relation thereto.

The body-portions 33 also support a pair of channelled guides 36, which are adapted to receive the offset end-portions of stitcher-roll supporting-slides 37. The other extremities of the slides 37 are provided with suitable bearings for the reception of stitcher-disks or presser-members 38 and 38'. Expansion springs 39 interposed between the slides 37 and the guides 36 resiliently hold the disk-stitchers in engagement with the core, as will be understood.

A pair of bearing-bosses 40, carried upon the stitcher-head 26, afford suitable bearings for a pair of vertical shafts 41 which carry pinions 42 at their upper extremities and worm gears 43 on their lower extremities. The pinions 42 are in constant engagement with racks 44 which are slidably mounted in the bosses 40 and held in engagement therewith by a pair of U-shaped guides 45 supported upon the shaft 41 and enclosing the pinions 42. One end of the rack 44 is pivotally connected to the stitcher-guide 32 by any suitable means, while the other end is free.

The worm gears 43 mesh with a common worm 46 carried upon a shaft 47 which is mounted in suitable bearings that are carried upon the stitcher pedestal 20. A hand-wheel 48 is fastened to one end of the shaft 47 and forms a means for rotating the worm 43, as will be understood.

Each of the semi-circular cams 31 is provided with an arm 49 which projects rearwardly and terminates in a boss 50 having a central bore 51 for a purpose later to be described. The arms 49 are also provided with bores 49', midway of their length, adapted to receive and encircle the shaft 41, thereby forming a pivot for the cams 31. These cams are held in a fixed position by spring-pressed pins 52 carried in the bosses 50 and adapted to be inserted into a pair of apertures 53 in the stitcher-head proper, as clearly seen in Fig. 2.

While in Figs. 1 and 2 I have illustrated the cams in a position wherein both of the stitcher-rolls 38 are at the same time in engagement with the core and wherein the spring-pressed pins 52 are shown as registering in the outer of the two apertures 53, yet (for the reasons already mentioned) it is more desirable to permit only one of the rolls 38 to be engaged with the core. To position one of the rolls away from the core, one of the pins 52 is raised out of engagement with the outermost of the holes 53 so that the cam may be swung on the shaft 41 as a pivot, and the pin 52 may then be seated in the innermost of the holes 53.

In Figs. 5 and 6 I have illustrated a modified form of stitcher-controlling means:

Upon the end of the shaft 41 I have mounted a supplemental disk 54, keyed or fastened in any suitable manner to a bushing 56 surrounding the shaft 41, above the guides 45. The disks 54 are provided with a series of apertures 55 adapted to receive the end of a spring-pressed bolt 58 carried in the outer extremity of an arm 59 which is keyed or otherwise secured to the upper end of the shaft 41. The lower end of the bushing 56 carries the pinion 42 and terminates by projecting into the lower bearing of the guide 45. By allowing the spring-pressed bolt 58 to engage in one of the holes 55 of the disk 54, any motion of the shaft 41 will be imparted to the gear 42 and thereby drive the rack 44 in a forward direction. Should it be desired, however, to secure the pinion 42 against rotating, the operator will grasp the knurled upper end of the bolt 58, give it an upward pull sufficient to cause the pin 60 in the bolt 58 to pass through the slot 61 in the arm 59, clear of the bearing, when a partial turn of the bolt 58 will cause the pin 60 to engage the upper surface of the bearing and retain the pin 58 in an elevated position free of the disk 54. The pinion 42 will thereby be retained in an idle position until such time as it is desired to be rotated, when the before-mentioned operation will be reversed.

In Fig. 4 I have illustrated still another modified form of stitching apparatus wherein only one stitcher-mechanism is used, and is mounted upon a continuous cam 62 corresponding in shape to the two cams 31, before described. The single stitcher unit or carriage is fed forward in a radial manner by the operator through the medium of the hand-lever 63, operated in the manner described with respect to the hand-wheel 29, in the construction of Fig. 2. The stitcher-supporting structure in this instance corresponds practically to one of those described with respect to Fig. 2, and is controlled in the cam 62 by a slotted arm 63 which is guided by one or another of the two upstanding pins 64 and 65, which work in the slot in the arm.

*Operation.*—The fabric sustained by the supply-rolls 11 is first carried forward down under the spreader-roll 14, and then up over and applied to the core. The core is then put in rotation by the engagement of one or another of the beveled gears 23 or 24, as described; it is then permitted to rotate for one complete revolution; and then it is stopped and the fabric severed where it forms a joint with the previously applied end of the stock. The core being then put in rapid rotation, the stitching mechanism is brought into operation.

As previously described, the nature of the cords and cord-fabric is such that while the core is rotated in one direction, only one of the stitchers, stitcher-disks, or pressure-members is brought into engagement therewith, while the other stitcher remains idle. Assuming the core to be rotating in the direction of the arrow in Fig. 1 and that the angle of the cords or threads (as the case may be) is as shown in dotted lines in Fig. 1, the stitcher-disk 38 only is brought into contact with the core. In this case, the stitcher-disk 38' and its controlling means will be thrown out of engagement by rotating the cam 31 upon the shaft 41 and positioning the pin 52 into the innermost aperture 53. The hand-wheel 48 will then be rotated to cause the carriage to be moved radially forward to the position shown in Fig. 2. The stitcher 38 is then moved radially forward by the action of the pinion 42 (which is rotated by the worm 46 and the hand-wheel 48) upon the rack 44.

After this stitcher-disk has completely stitched the fabric down on the one side of the core, it is returned to its initial position; the core is then reversed in its direction of rotation; and the other stitcher-disk 38' is brought into engagement with the opposite side of the core, the stitcher-disk 38 and its controlling means having first been thrown out of operation, as before described.

Should it be so desired to use both stitchers in the same operation, both of the cams 31 will be put into operating position with respect to the core and the same method of stitching followed.

From the foregoing it will be readily seen that I have provided means for stitching one or both sides of a ply of fabric at one time, and have also provided means for permitting the application of the fabric to the core in such a way that the angularity of the threads will be at right-angles to the preceding ply as is desired.

It will be understood, however, that the primary purpose of the present invention is to provide a structure wherein the core is first rotated in one direction while the stitcher is traversing the threads or cords longitudinally to stretch and tension them, and then to reverse the direction of rotation of the core so that the stitcher may then longitudinally traverse the threads or cords on the opposite side of the median line of the core. In this way the threads or cords on opposite sides of that median line will be operated on and stretched and formed, all in the same longitudinal direction and with no cross-wise action of the stitchers on any of such threads or cords, which would, as has already been explained, result in displacement or distortion thereof and improper laying down of the body of the thread or cord blanket. Of course, practically the same end could be attained—though not so conveniently—were the carcass-forming core reversed in its position on its sustaining chuck.

Tire-fabric, such as the cord-fabric, has a primary thread or cord, and it is upon that element particularly that the stitchers operate, and which it is, of course, desirable to stretch and lay down in the stitching operation. This fabric also has a secondary, that is, a connecting or holding thread or strand. It is to be understood, therefore, that my invention has the especial function to effect certain results on the primary thread or cord; but it is also within the contemplation of my invention that the stitchers shall similarly act on the other threads of the fabric-structure. By the novel method herein disclosed I produce a new article of manufacture, and this I claim as well as the method for producing it.

What I claim is:

1. A method of manufacturing tires which consists in applying a fabric to a mandrel, revolving the mandrel in one direction and simultaneously moving inwardly and radially over one side of the mandrel a forming element, and then reversing the direction of rotation of the mandrel and moving the forming element inwardly and radially over the other side of the mandrel.

2. A method of manufacturing tires which consists in applying an annular band of fabric to an annular mandrel, revolving the mandrel in one direction and simultaneously moving inwardly and radially over one side of the mandrel a stitching or forming element, and then reversing the direction of rotation of the mandrel and moving the stitching or forming element inwardly and radially over the other side of the mandrel.

3. The herein described method of forming tire-carasses which consists in rotating a mass of cord elements in one diection and simultaneously stitching a portion of them according to their longitudinal lay, and then reversing the direction of rotation of the mass and similarly stitching other of their portions.

4. The method of manufacturing tires on a tire-building core which consists in stitching down one side of the core in the longitudinal direction of the primary threads or cords thereon, and then reversing the core and rotating it in the opposite direction and stitching down the other side of the core.

5. The method of forming tires on a tire-forming core which consists in rotating on the core a mass of cords or threads of which the tire is to be made and simultaneously pressing these down on the core always in the direction of their length; then reversing the direction of rotation of the core and similarly pressing the cords on the opposite side of the core in the direction of their length.

6. The method of manufacturing tires, which consists in stitching down the elements of the carcass-forming fabric lengthwise of the primary threads thereof on both sides of the median line of the tire.

7. A method of manufacturing tire-carcasses on a tire-building core which consists in rotating the core alternately in opposite directions so that both sides of a carcass-forming fabric are presented to stitching-mechanism, and stitching down the cords or threads of the fabric always in the direction of their length.

8. A method of manufacturing tire-carcasses which consists in selecting the primary cords or threads to be spun down, spinning down the selected cords or threads on one side of the median line so as to stretch them, and then separately spinning down the opposite side of the tire in an opposite direction, whereby to spin both sides of the tire-carcass uniformly.

9. As a new article of manufacture, a cord-tire having its fabric worked down lengthwise of the primary cords or threads on both sides of the median line of the tire.

10. As a new article of manufacture, a machine-made cord-tire having the fabric spun down lengthwise of the primary threads on both sides of the median line of the tire.

11. As a new article of manufacture, a machine-made cord-tire having its primary threads worked lengthwise thereof on both sides of the median line of the tire.

12. As a new article of manufacture, a machine-made cord-tire having its primary cords spun down lengthwise thereof on both sides of the median line of the tire.

13. As a new article of manufacture, a machine-made tire build up on a forming-core from a plurality of fabric plies, each of which consists of a number of parallel cords, the said cords being shaped to the core by moving a presser-member lengthwise along the cords on both sides of the median line of the tire.

14. As a new article of manufacture, a machine-made cord-carcass built up on a carcass-forming core from a plurality of cords arranged in parallelism, said cords being shaped to the core by a presser-member moved lengthwise along the cords on each side of the median line of the carcass.

15. As a new article of manufacture, a tire having the fabric worked down lengthwise of the warp threads on both sidess of the median line of the tire.

16. As a new article of manufacture, a machine-made tire having the fabric spun down lengthwise of the warp threads on both sides of the median line of the tire.

17. As a new article of manufacture, a machine-made tire having its warp threads worked lengthwise thereof on both sides of the median line of the tire.

18. A method of manufacturing tires on a tire machine which consists in working down one side of the tire in the direction lengthwise of the warp or tension threads, reversing the core and rotating it in the opposite direction and spinning down the other side of the tire.

19. A method of manufacturing tires, which consists in working down the fabric lengthwise of the warp threads on both sides of the median line of the tire.

20. A method of manufacturing tires on a tire machine, which consists in rotating both sides of the tire in such direction that both sides of the warp or tension threads incline rearward relative to the direction of movement, and spinning down said warp threads.

21. A method of manufacturing tires which consists in selecting the warp or weft threads to be spun down, spinning down the selected threads on one side of the median line, so as to stretch them, and then separately spinning down the opposite side of the tire in an opposite direction, whereby to spin both sides of the tire uniformly.

22. As a new article of manufacture, a machine-made tire having its principal cords spun down lengthwise thereof on both sides of the median line of the tire.

23. The herein-described method of forming tire-carcasses, which consists in rotating a mass of cord-elements for a plurality of cycles of operation and simultaneously stitching said elements, first the portions thereof on one side of the median line of the mass during the first cycle and in the general direction of the lay of the cords and, then, the portions thereof on the opposite side of said line, during the second cycle, and likewise in the general direction of their lay.

24. The herein-described method of forming tire-carcasses, which consists in rotating a mass of cord-elements for a plurality of cycles of operation and simultaneously stitching said elements, first the portions thereof on one side of the median line of the mass during the first cycle and in the general direction of the lay of the cords and, then, the portions thereof on the opposite side of said line, during the second cycle, and likewise in the general direction of their lay, the stitching in the second cycle being successive to that of the first.

25. The herein-described method of forming tire-carcasses, which consists in rotating a mass of cord-elements for a plurality of cycles of operation and simultaneously stitching said elements, first the portions thereof on one side of the median line of the mass during the first cycle and in the general direction of the lay of the cords and, then, the portions thereof on the opposite side of said line, during the second cycle, and likewise in the general direction of their lay, the stitching in the second cycle being in a direction approximately opposite to that of the first.

26. The herein-described method of producing tire-carcasses which consists in rotating a forming core for carrying plies of cord-elements for a plurality of cycles of operation and during the first cycle simultaneously stitching down the portions of said elements of one or more plies at one side of their median line and in the general direction of the lay of the elements, then, as a successive step and in the second cycle, stitching down the portions of said elements at the opposite side of said line and in the direction, generally, of their lay, then superposing thereon one ply or a plurality of plies of said elements, and then successively performing said cycles of stitching operations thereon.

27. The herein-described method of producing tire-carcasses which consists in rotating a forming core for carrying plies of cord-elements for a plurality of cycles of operation and during the first cycle simultaneously stitching down the portions of said elements of one or more plies at one side of their median line and in the general direction of the lay of the elements, then, as a successive step and in the second cycle, stitching down the portions of said elements at the opposite side of said line and in the direction, generally, of their lay, then superposing thereon one ply or a plurality of plies of said elements, and simultaneously oppositely crossing the cords of such ply or plies.

28. The herein-described method of producing tire-carcasses which consists in rotating a forming core for carrying plies of cord-elements for a plurality of cycles of operation and, during the first cycle and simultaneously with the rotation of the core, stitching down thereon the portions of the elements lying at one side of the median line of the core and in the general direction of the lay of said elements, then, as the second cycle, stitching down those portions of the elements lying at the opposite side of said median line and in the general direction of their lay, then superposing thereon one additional ply or a plurality of plies, and then performing each of said cycles of operation on the superposed ply or plies.

29. The herein-described method of producing tire-carcasses which consists in rotating a forming core for carrying plies of cord-elements for a plurality of cycles of operation and, during the first cycle and simultaneously with the rotation of the core, stitching down thereon the portions of the elements lying at one side of the median line of the core and in the general direction of the lay of said elements, then, as the second cycle, stitching down those portions of the elements lying at the opposite side of said median line and in the general direction of their lay, then superposing thereon one additional ply or a plurality of plies, and at the same time effecting a crossing of the elements of certain of the respective plies, and then performing each of said cycles of operation on the superposed ply or plies.

30. The herein-described method of producing a tire-carcass which consists in rotating a tire-forming core for a plurality of cycles of stitching-operations, superposing a ply or a plurality of plies of cord-fabric thereon with the cord-elements disposed at an angle to the median line of the core, then, during the first cycle of rotation of the core, stitching down portions of the elements lying at one side of said median line and in the general direction of lay of the elements, then, during the second cycle of rotation of the core, stitching down the portions of the elements lying at the opposite side of said line and, likewise, in the general direction of their lay, then superposing thereon an additional ply or additional plies having their cord-elements also disposed at an angle to the median line of the core and, at the same time, effecting a crossing of certain of the cord-elements with respect to each other, and, then, performing the plurality of cycles of stitching-operations on such superposed ply or plies and, respectively, in the direction of lay of the elements in respect to said median line of the core.

In witness whereof, I have hereunto signed my name in the presence of two subscribing witnesses.

WILLIAM B. HARSEL.

Witnesses:
B. J. McDANEL,
R. S. TROGNER.